US006313420B1

(12) United States Patent
Ohashi

(10) Patent No.: US 6,313,420 B1
(45) Date of Patent: Nov. 6, 2001

(54) SLIDE SWITCH

(75) Inventor: Yoshihiro Ohashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/826,605

(22) Filed: Apr. 5, 2001

(30) Foreign Application Priority Data

Apr. 13, 2000 (JP) ........................................ 12-117214

(51) Int. Cl.[7] ........................................ H01M 9/04
(52) U.S. Cl. ........................................ 200/302.1; 200/547
(58) Field of Search ........................................ 200/16 R–16 D, 200/547, 549, 550, 302.1, 329

(56) References Cited

U.S. PATENT DOCUMENTS 3,723,692 * 3/1973 Wilbrecht ........................ 200/168 H
4,764,745 * 8/1988 Aoi et al. ........................ 337/2
4,876,422 * 10/1989 Kanezawa ........................ 200/302.1
5,575,380 * 11/1996 Imai ........................ 200/302.2

* cited by examiner

*Primary Examiner*—Michael Friedhofer
(74) *Attorney, Agent, or Firm*—Brinks Hofer Gilson & Lione

(57) ABSTRACT

A slide switch comprising a case having a slide hole, a slide knob attached slidably to an outer surface of the case, the slide knob having a shaft portion inserted into the slide hole of the case, a shield member disposed between a lower surface of the slide knob and an outer surface of the case, the shield member having an insertion hole for insertion therein of the shaft portion of the slide knob, and a contact member disposed in the interior of the case and retained by the shaft portion of the slide knob, wherein the shield member is engaged with the shaft portion of the slide knob so as to be slidable with the slide knob and is formed with an annular projection outside an outer periphery of the insertion hole, also formed with a thin plate-like substrate portion inside the annular projection, and is further formed with a thin plate-like outer edge portion which surrounds the outside of the annular projection.

3 Claims, 8 Drawing Sheets

SLIDE SWITCH

BACKGROUND OF THE INVENTION

1. Field of the Invention

The present invention relates to a slide switch to be used in an attached state to, for example, a case of an electronic device for an automobile. Particularly, the invention is concerned with a waterproof structure for both the case and an operating knob.

2. Description of the Prior Art

As an electronic device used in an automobile there is known a remote keyless entry device, in which is used a slide switch as a memory recall switch.

An example of such a conventional slide switch is illustrated in FIGS. 6 to 10, of which FIG. 6 is an exploded perspective view of a remote keyless entry device, FIG. 7 is an exploded perspective view of a slide switch portion, FIG. 8 is a plan view of the slide switch portion, FIG. 9 is a sectional view taken on line 9—9 in FIG. 8, and FIG. 10 is a sectional view taken on line 10—10 in FIG. 8.

In the figures, an upper case 11 and a lower case 12 are each formed in a box shape having a receptacle portion in the interior thereof, using an insulating material such as a synthetic resin. The upper and lower cases 11, 12 are superimposed one on the other to constitute a casing. A plurality of window apertures 11*a* are formed in the upper case 11 and a rubber key pad 13 is received in the receptacle portion of the case. The rubber key pad 13 is formed in a box shape having a lower opening, using, for example, silicone rubber or an elastomer resin having flexibility. On an upper surface side of the rubber key pad 13 are integrally formed a plurality of operating keys 13*a* so as to project into the window apertures 11*a* respectively. Further, a substrate block 15 with electronic circuit components, e.g., push-button switches 14, mounted thereon is attached to a lower surface side of the rubber key pad 13. Thus, the substrate block 15 is covered with the rubber key pad 13 to shield the electronic circuit components against the entry of water or water drops.

The lower case 12 is provided with a cell receptacle portion 12*a* for receiving a button-shaped cell 16 therein and is also provided with a contact receptacle portion 12*b* for receiving therein a slide contact 17 as a contact member which constitutes a slide switch. The slide contact 17 is formed using an electrically conductive metallic plate such as, for example, a stainless steel plate or a phosphor bronze plate. The slide contact 17 is disposed in the contact receptacle portion 12*b* slidably. Further, the slide contact 17 is provided with spring pieces 17*a* for elastic contact with the inside of the lower case 12. Outside the lower case 12 is mounted a slide knob 18 which is engaged with the slide contact 17 and which is formed of an insulating material such as a synthetic resin, and is also provided a slide portion 12*c* adapted to be slid. The slide portion 12*c* is formed with a slide hole 12*d* for insertion therein of a shaft portion 18*a* of the slide knob 18.

Outside the slide hole 12*d* of the slide portion 12*c* is formed an annular recess 12*e*, into which is engaged an O ring-like rubber seal 19 formed of an elastic material such as rubber. When the shaft portion 18*a* of the slide knob 18 is inserted into the slide hole 12*d* of the lower case 12 and is put in engagement with the slide contact 17, a lower surface of the slide knob 18 is brought into elastic contact with the rubber seal 19 with the biasing force of the spring pieces 17*a* of the slide contact 17, thereby preventing the entry of water or water drops from the slide hole 12*d* of the slide portion 12*c*.

However, in the above conventional slide switch structure, for stably positioning the O ring-like rubber seal 19 against a frictional force acting between it and a lower surface of the slide knob 18, it is necessary that the recess 12*e* be formed in the slide portion 12*c* and that therefore the thickness of the lower case 12 be increased by an amount corresponding to the recess 12*e*, thus giving rise to the problem that the thickness of the casing increases.

Besides, the working efficiency of the work for bringing the rubber seal 19 into engagement with the recess 12*c* is poor and there arises the problem that the rubber seal 19 comes off during the assembling work.

SUMMARY OF THE INVENTION

Accordingly, it is an object of the present invention to solve the above-mentioned problems and provide a slide switch structure capable of positioning a shield member stably without increasing the case thickness and without impairing the waterproofness between the case upper surface and the slide knob lower surface and superior in the assembling work efficiency.

According to a first aspect of the present invention there is provided a slide switch comprising a case having a slide hole, a slide knob attached slidably to an outer surface of the case, the slide knob having a shaft portion inserted into the slide hole of the case, a shield member disposed between a lower surface of the slide knob and an outer surface of the case, the shield member having an insertion hole for insertion therein of the shaft portion of the slide knob, and a contact member disposed in the interior of the case and retained by the shaft portion of the slide knob, wherein the shield member is engaged with the shaft portion of the slide knob so as to be slidable with the slide knob and is formed with an annular projection outside an outer periphery of the insertion hole, also formed with a thin plate-like substrate portion inside the annular projection, the substrate portion having the insertion hole, and is further formed with a thin plate-like outer edge portion which surrounds the outside of the annular projection.

According to a second aspect of the invention there is provided, in combination with the first aspect above, a slide switch wherein the annular projection is formed on each of upper and lower surfaces of the shield member so that the shield member is spaced from the lower surface of the slide knob and also from the outer surface of the case.

According to a third aspect of the invention there is provided, in combination with the second aspect above, a slide switch wherein the contact member is provided with a spring piece for elastic contact with an inner surface of the case, and the shield member is held grippingly between the lower surface of the slide knob and the outer surface of the case with the biasing force of the spring piece.

DETAILED DESCRIPTION OF A PREFERRED EMBODIMENT

Figure 1:
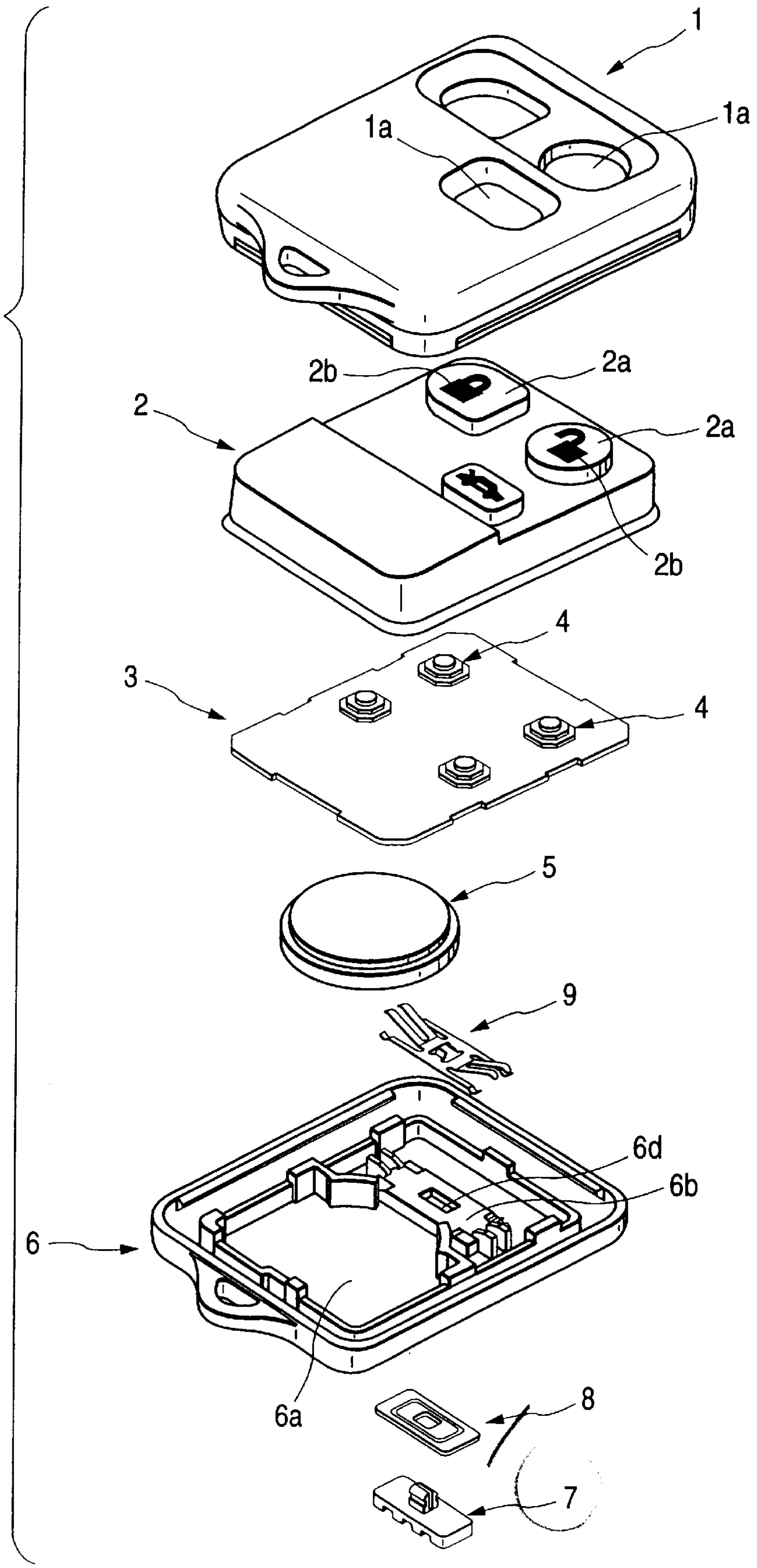
FIG. 1 is an exploded perspective view showing a remote keyless entry device in which a slide switch according to an embodiment of the present invention is incorporated.
Figure 2:
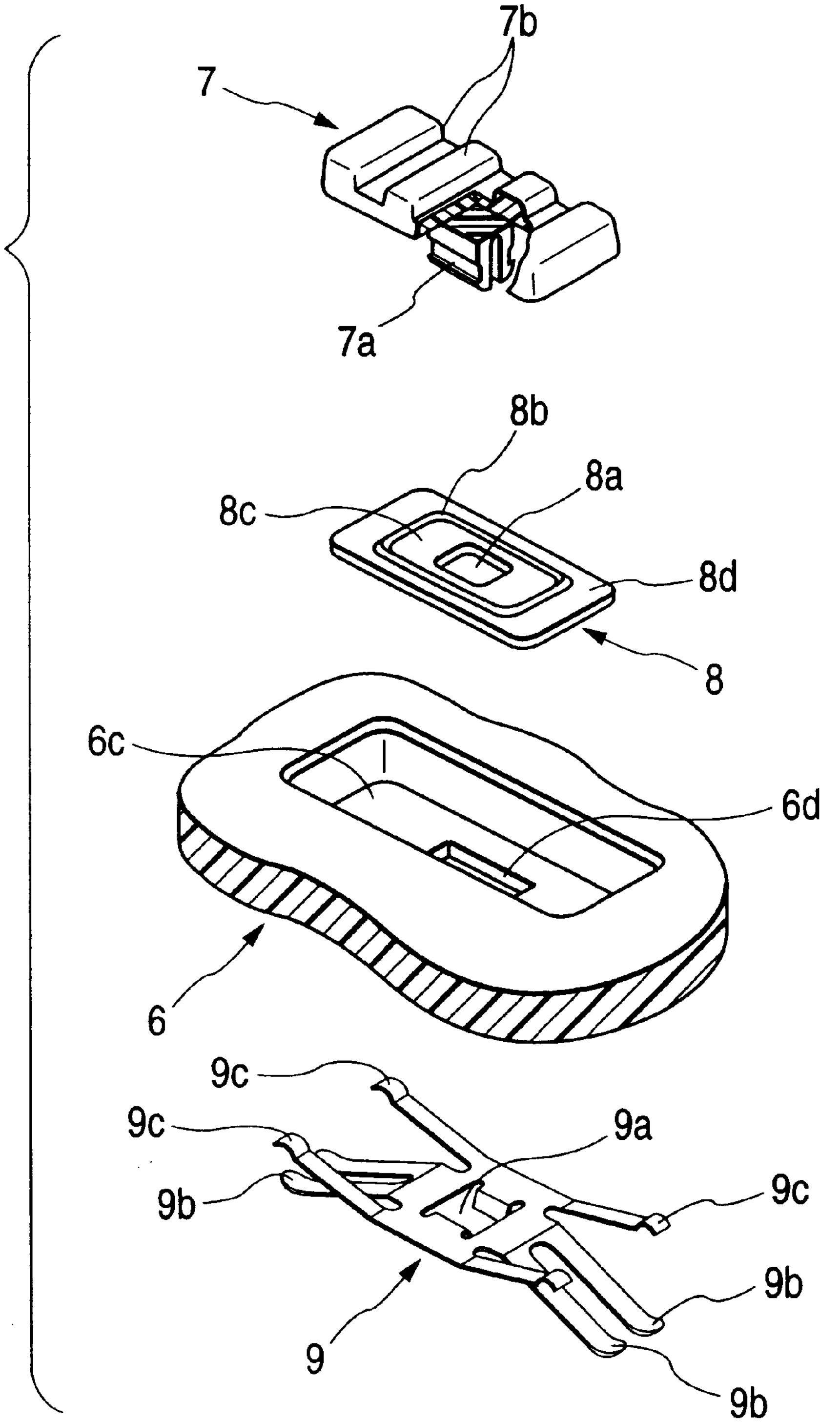
FIG. 2 is an exploded perspective view showing the slide switch portion of the remote keyless entry device shown in FIG. 1.
Figure 3:
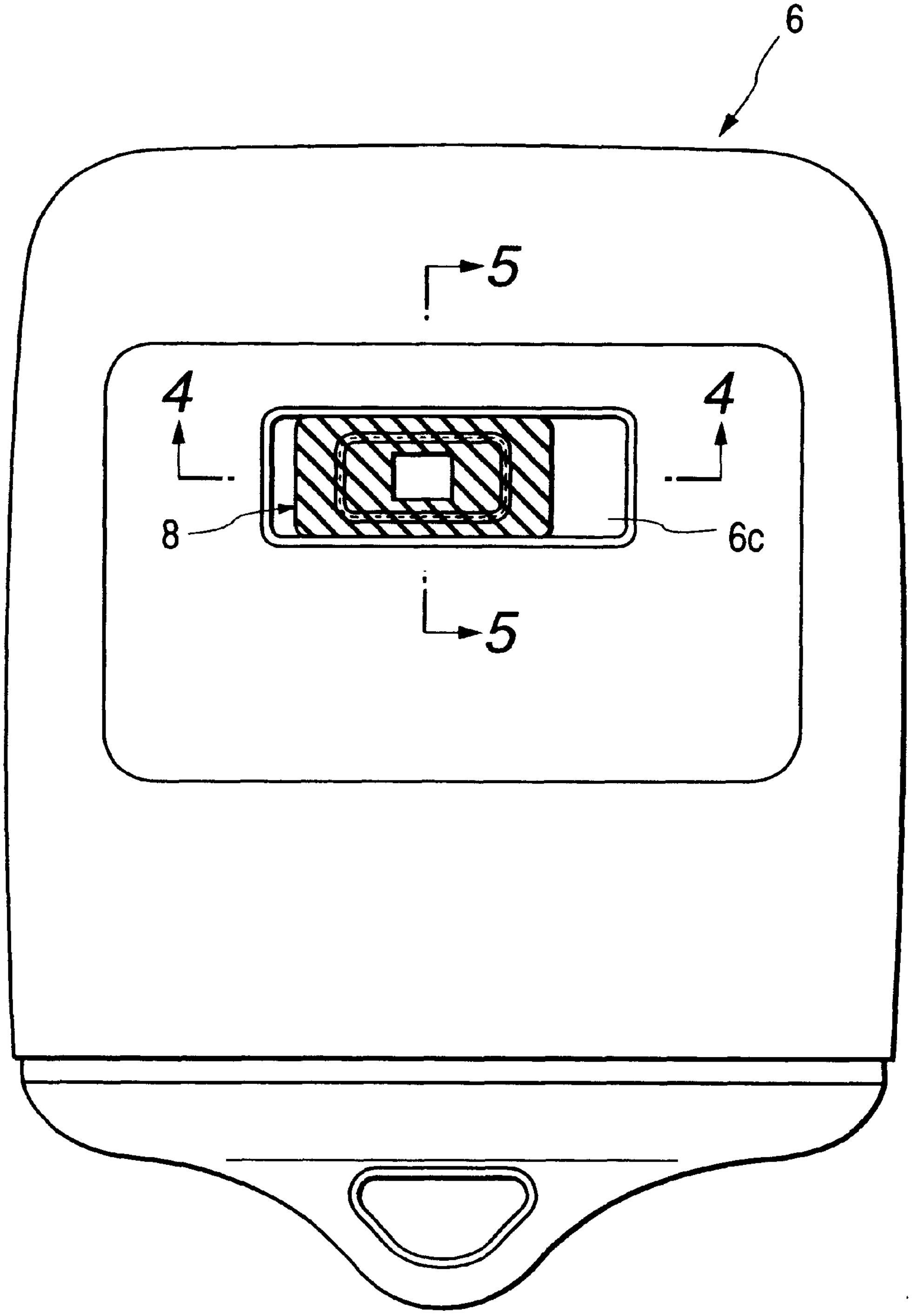
FIG. 3 is a plan view showing the mounting portion of the slide switch of the remote keyless entry device shown in FIG. 1.
Figure 4:
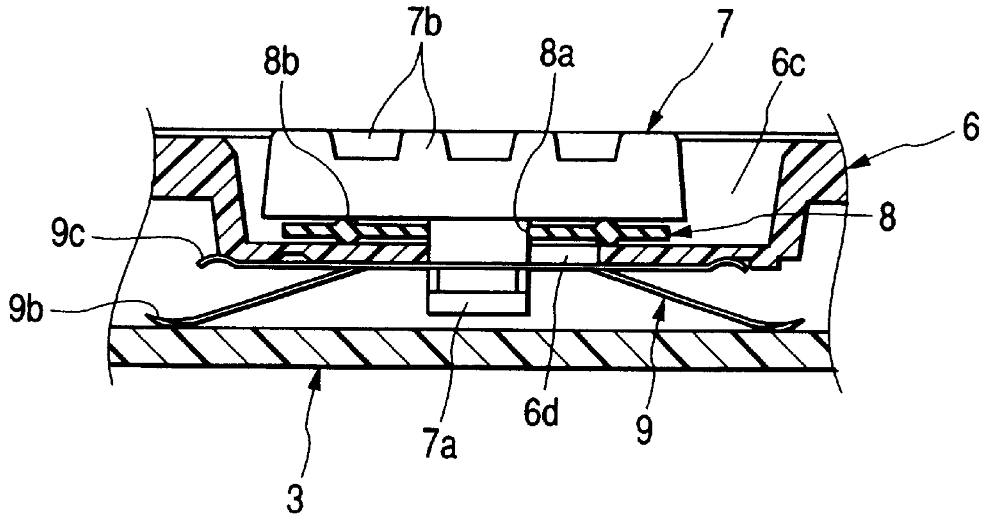
FIG. 4 is a sectional view taken on line 4—4 in FIG. 3.
Figure 5:
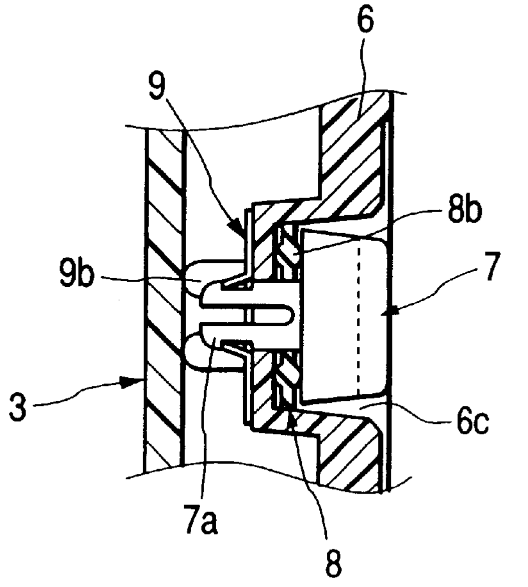
FIG. 5 is a sectional view taken on line 5—5 in FIG. 3.
Figure 6:
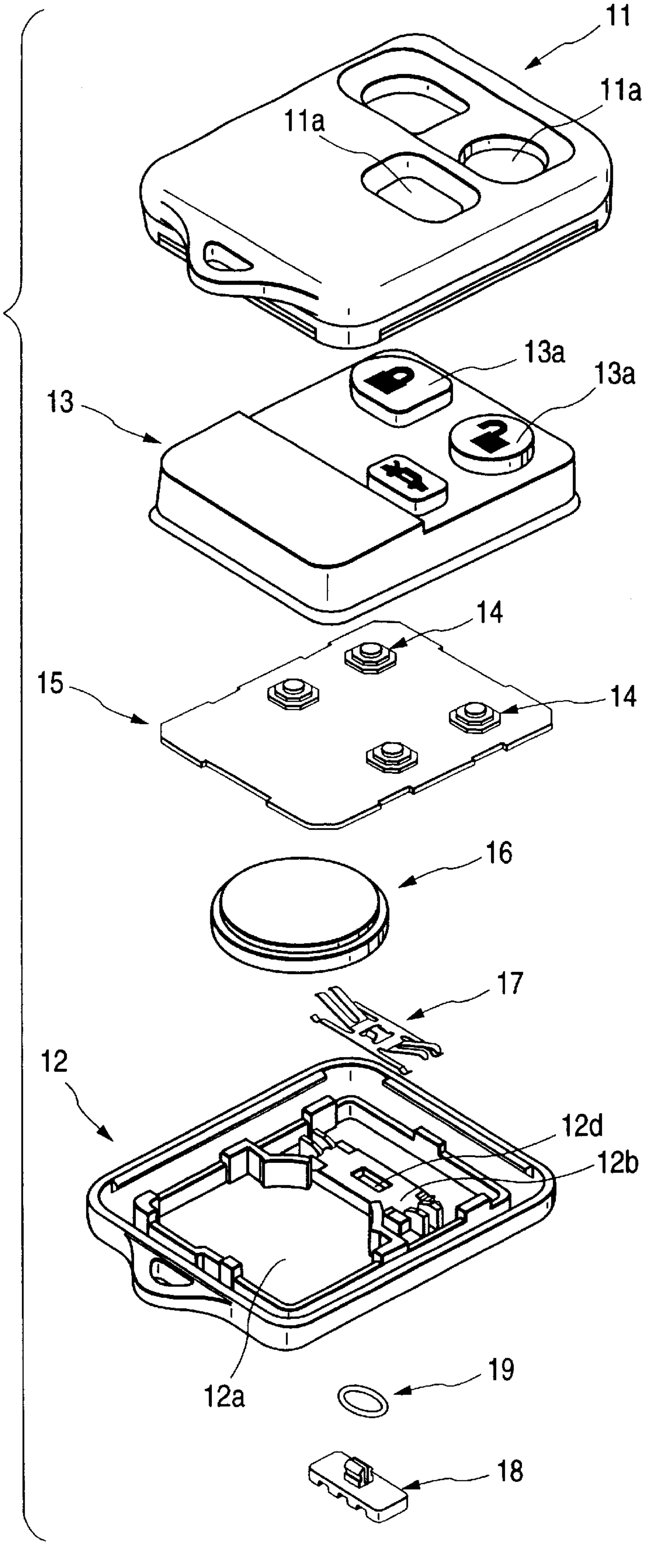
FIG. 6 PRIOR ART
FIG. 6 is an exploded perspective view showing a remote keyless entry device with a conventional slide switch attached thereto.
Figure 7:
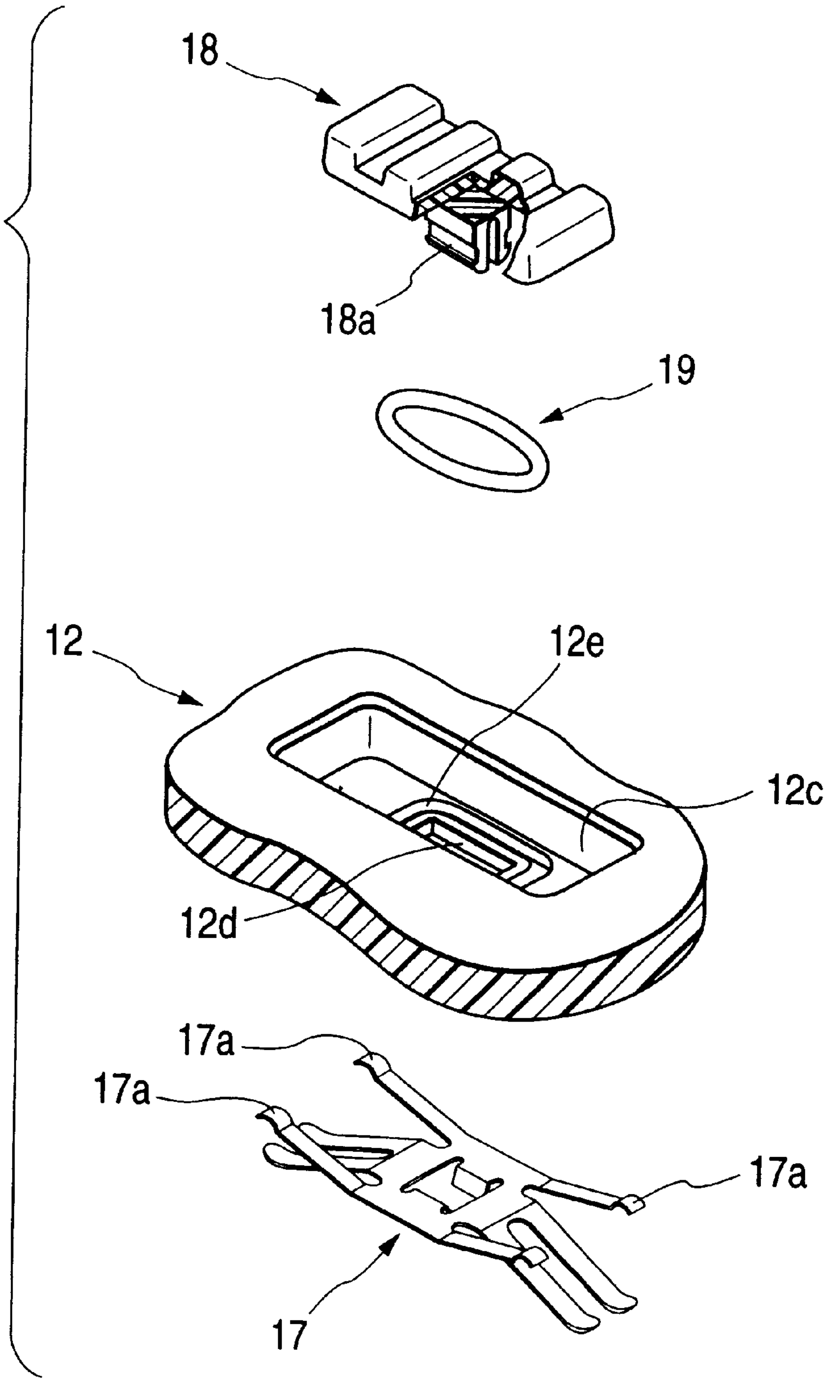
FIG. 7 PRIOR ART
FIG. 7 is an exploded perspective view of the slide switch portion of the conventional slide switch.
Figure 8:
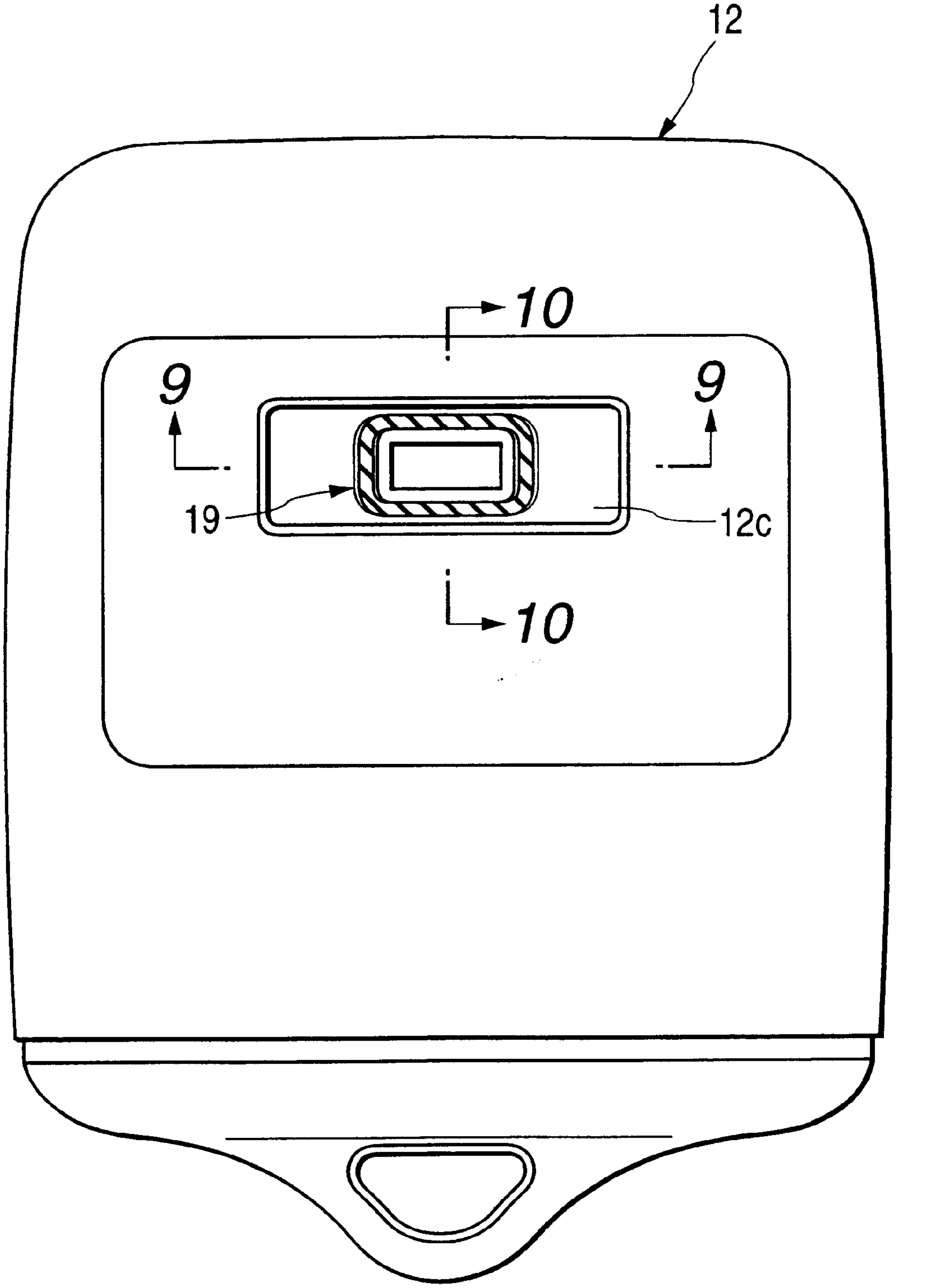
FIG. 8 PRIOR ART
FIG. 8 is a plan view showing a mounting portion of the conventional slide switch.
Figure 9:
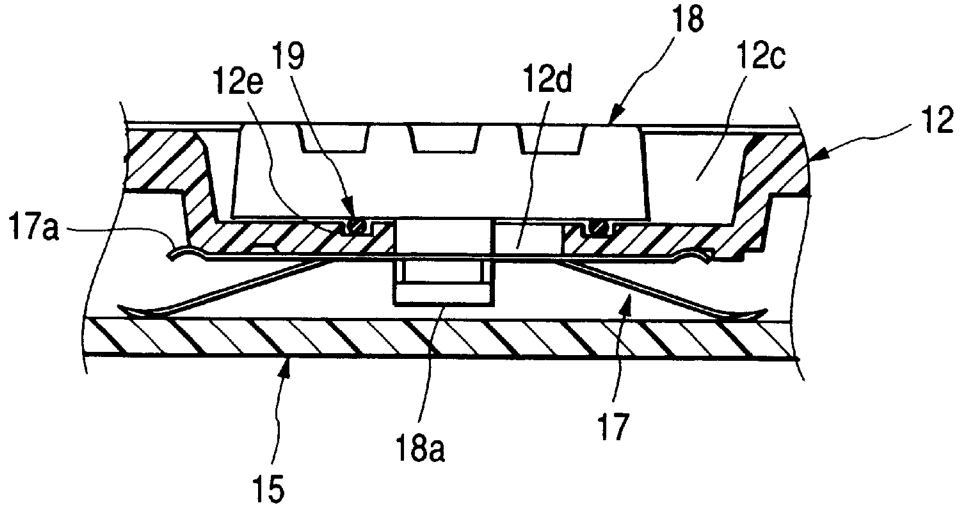
FIG. 9 PRIOR ART
FIG. 9 is a sectional view taken on line 9—9 in FIG. 8.
Figure 10:
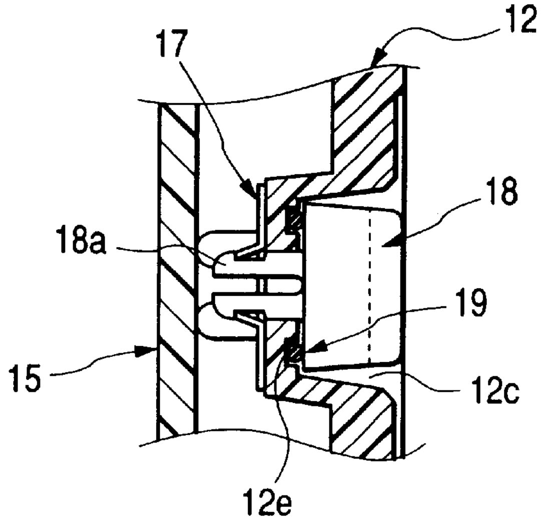
FIG. 10 PRIOR ART
FIG. 10 is a sectional view taken on line 10—10 in FIG. 8.

The structure of a slide switch according to an embodiment of the present invention will be described hereinunder with reference to FIGS. 1 to 5, of which FIG. 1 is an exploded perspective view of a remote keyless entry device, FIG. 2 is an exploded perspective view of a slide switch portion, FIG. 3 is a plan view thereof, FIG. 4 is a sectional view taken on line 4—4 in FIG. 3, and FIG. 5 is a sectional view taken on line 5—5 in FIG. 3.

In the figures, an upper case 1 is formed in a box shape having a lower opening, using an insulating material such as a synthetic resin. On an upper surface side of the upper case 1 are formed a plurality of window apertures 1*a*, into which are inserted operating keys 2*a* formed on a rubber key pad 2 which will be described later.

The rubber key pad 2 is formed in a box shape having a lower opening, using an elastic material such as silicone rubber or a flexible elastomer resin. On an upper surface side of the rubber key pad 2 are provided a plurality of operating keys 2*a*, which are inserted into the window apertures la of the upper case 1. On the surface of each operating key 2*a* is marked an index (e.g., LOCK or UNLOCK) 2*b* which indicates an operating mode.

A substrate block 3 is constituted by a laminate of a phenolic resin for example, with various electronic circuit components being mounted on the surface and the back of the substrate block 3. On the surface of the substrate block 3 are disposed a plurality of push-button switches 4 at positions opposed to the operating keys 2*a* formed on the rubber key pad 2. The push-button switches 4 are turned ON and OFF by pushing and releasing the operating keys 2*a*.

On the back of the substrate block 3 are disposed a pair of fixed contacts (not shown) against which a slide contact 9 to be described later comes into abutment to switch over the circuit of the slide switch, and are also disposed positive and negative terminals (not shown) of a cell 5 to be described later.

The cell 5, which is a button-shaped cell, serves as a power supply for the supply of electric power to various electronic circuit components mounted on the substrate block 3 and is connected to the positive and negative electrodes disposed on the substrate block.

A lower case 6 is formed in a box shape having an upper opening, using an insulating material such as a synthetic resin. In the opening portion of the lower case 6 are formed a cell receptacle portion 6*a* for receiving the cell 5 therein and a slide contact receptacle portion 6*b* for receiving therein a slide contact 9 which will be described later.

On a lower surface side of the lower case 6 is formed a slide slot 6*c* for receiving therein a seal member 8 and a slide knob 7 both of which will be described later. In an inner bottom of the slide slot 6*c* is formed a slide hole 6*d* into which is inserted a shaft portion 7*a* of the slide knob 7.

The slide knob 7 is formed in a generally rectangular shape using an insulating material such as a synthetic resin, with a shaft portion 7*a* being projected centrally on a lower surface side of the slide knob 7. The shaft portion 7*a* is inserted into the slide hole 6*d* formed in the lower case 6 so that the slide knob 7 is slidable in a predetermined slide direction. On an upper surface side of the slide knob 7 is formed a concave-convex portion 7*b* for operation so as to facilitate a sliding operation with a finger or the like.

The shield member 8 is formed in a generally rectangular shape using an elastic material such as rubber, and an insertion hole 8*a* for insertion of the shaft portion 7*a* therein is formed in a central part of the shield member 8. Outside the insertion hole 8*a* and on both upper and lower surfaces of the shield member 8 are formed annular projections 8b as continuous projections so as to cover the slide hole 6*d* formed in the lower case 6. The insertion hole 8*a* of the shield member 8 is fitted on the shaft portion 7*a* of the slide knob 7 and the annular projections 8b are formed so as to be always positioned outside an outer periphery of the slide hole 6*d* even when the shield member 8 slides with the sliding motion of the slide knob 7 within the slide hole 6*d*.

With the annular projections 8*b*, a thin plate-like substrate portion 8*c* having the through hole 8*a* is formed inside the annular projections 8*b* and also a thin plate-like outer edge portion 8*d* is formed outside the annular projections 8*b* so as to surround the annular projections.

With the annular projections 8*b*, the substrate portion 8*c* and the outer edge portion 8*d* of the shield member 8 are spaced a predetermined distance from the lower surface of the slide knob 7 and also from an outer surface of the lower case 6. Therefore, even when the slide knob 7 slides within the slide hole 6*d*, the shield member 8 is not rubbed throughout the whole surface thereof against the lower surface of the slide knob 7 and the outer surface of the lower case 6. Consequently, the slide knob 7 can be prevented from becoming worse in its operating touch due to, for example, a rough outer surface of the lower case 6.

Since the shield member 8 is formed with the thin plate-like outer edge portion 8*d* outside the annular projections 8*b* so as to surround the annular projections, even if the annular projections 8*b* undergo a force acting in a direction of being wound to the outer surface side of the lower case 6 due to rubbing thereof against the outer surface of the lower case 6 during a sliding motion of the annular projections 8*b*, the outer edge portion 8*d* functions to mitigate the phenomenon of the annular projections 8*b* being wound to inhibit the movement in the sliding direction, whereby a smooth sliding motion can be ensured.

The slide contact 9 is formed by an electrically conductive metallic plate such as a stainless steel plate or a phosphor bronze plate. Centrally of the slide contact 9 is formed a retaining hole 9*a* for retaining the shaft portion 7*a* of the slide knob 7. On each of both sides and at each of opposed positions with respect to the central part of the slide contact 9 are provided a pair of contact pieces 9*b* for contact with and disengagement from fixed contacts (not shown), the contact pieces 9*b* being bent to the substrate block 3 side. Further, at four corners outside the contact pieces 9 are formed spring pieces 9*c* which are brought into elastic contact with an inner surface of the lower case 6. With the biasing force of the spring pieces 9*c*, the shield member 8 is held grippingly between the lower surface of the slide knob 7 and the outer surface of the lower case 6.

Since the biasing force of the spring pieces 9*c* permits the lower surface of the slide knob 7 and the outer surface of the lower case 6 to be closely contacted with each other to a satisfactory extent through the shield member 8, it is possible to prevent the entry of water or water drops into the interior of the lower case 6 from the exterior.

The slide switch constructed as above is assembled in the following manner. First, the slide contact 9 is accommodated into the slide contact receptacle portion 6*b* formed in the opening portion of the lower case 6. Then, the shield member 8 is accommodated into the slide slot 6*c* formed in the lower surface of the lower case 6 and the shaft portion 7*a* of the slide knob 7 is inserted into the insertion hole 8*a* of the shield member 8 and also into the slide hole 6*d* formed in the slide slot 6*c*, allowing the tip end of the shaft portion 7*a* to be engaged with the retaining hole 9*a* of the slide contact 9. As a result, the slide knob 7 is mounted slidably to the slide slot 6*c* of the lower case 6.

Next, the cell 5 is accommodated into the cell receptacle portion 6*a* of the lower case 6.

Then, the rubber key pad 2 is inserted into the opening portion of the upper case 1. At this time, the operating keys 2*a* formed on the rubber key pad 2 are inserted into the window apertures 1*a* of the upper case 1 and are thus arranged on the upper surface side of the upper case.

Next, the substrate block 3 is inserted into the opening portion on the lower surface side of the rubber key pad 2. At this time, the push-button switches 4 disposed on the substrate block 3 are positioned respectively in opposition to the undersides of the operating keys 2*a*.

Thereafter, the upper case 1 and the lower case 6 are fitted together to complete the assembling work.

In this completed assembly, an outer peripheral edge portion of the rubber key pad 2 is held grippingly in the fitted portion of the upper and lower cases 1, 6 and is engaged in pressure contact with the fitted portion, thereby preventing the entry of water or water drops into the case interior from the exterior.

In this embodiment, as described above, the slide knob 7 having the shaft portion 7*a* is accommodated slidably into the slide slot 6*c* formed in the outer surface of the lower case 6, the shield member 8 is interposed between the lower surface of the slide knob 7 and the outer surface of the lower case 6, the shield member 8 is brought into engagement with the shaft portion 7*a* so as to be slidable with the slide knob 7, and the continuous annular projections 8*b* are formed respectively on the upper and lower surfaces of the shield member 8 so as to be always positioned outside the outer periphery of the slide hole 6*d* formed in the slide slot 6*c*. Therefore, unlike the prior art, it is not required to form a recess in the slide slot 6*c* for stably positioning the a O ring-like rubber seal against a frictional force induced between the shield member 8 and the lower surface of the slide knob 7, nor is it required to increase the thickness of the lower case 6 by an amount corresponding to the recess. Thus, there is no fear of increase in thickness of the casing.

Besides, since the positioning of the shield member 8 can be done by merely engaging the shield member with the shaft portion 7*a* of the slide knob 7, the working efficiency is improved and there no longer is any fear that the shield member 8 may come off during assembly.

Since the shield member 8 is formed with the annular projections 8*b*, the substrate portion 8*c* and the outer edge portion 8*d* are spaced a predetermined distance from the lower surface of the slide knob 7 and also from the outer surface of the lower case 6. Therefore, even when the slide knob 7 slides within the slide hole 6*d*, the shield member 8 is not rubbed throughout the whole surface thereof against the lower surface of the slide knob 7 and the outer surface of the lower case 6, whereby the slide knob 7 can be prevented from becoming worse in its operating touch due to, for example, a rough outer surface of the lower case 6.

Moreover, even if the annular projections 8*b* undergo a force acting in a direction of being wound to the outer surface side of the lower case 6 due to rubbing against the outer surface of the lower case 6 during a sliding motion thereof, it is possible to mitigate the phenomenon of inhibiting the movement in the sliding direction and hence possible to ensure a smooth sliding motion.

Further, since the spring pieces 9*c*, which are urged in a direction opposite to the contact pieces 9*b* and which are brought into elastic contact with the inner surface of the lower case 6, are provided respectively at four corners outside the contact pieces 9*b* of the slide contact 9 and with the biasing force of the spring pieces 9*c* the shield member 8 is held grippingly between the lower surface of the slide knob 7 and the outer surface of the lower case 6, the lower surface of the slide knob 7 and the outer surface of the lower case 6 are brought into close contact with each other through the shield member 8 to a satisfactory extent by virtue of the spring pieces 9*c*, thus making it possible to prevent the entry of water or water drops into the interior of the lower case 6 from the exterior.

As set forth above, the slide switch of the present invention comprises a case having a slide hole, a slide knob attached slidably to an outer surface of the case, the slide knob having a shaft portion inserted into the slide hole of the case, a shield member disposed between a lower surface of the slide knob and an outer surface of the case, the shield member having an insertion hole for insertion therein of the shaft portion of the slide knob, and a contact member disposed in the interior of the case and retained by the shaft portion of the slide knob, the shield member being engaged with the shaft portion of the slide knob so as to be slidable with the slide knob and being formed with annular projections outside the outer periphery of the slide hole. Therefore, a shield member positioning recess need not be formed in the outer surface of the case and hence it becomes unnecessary to increase the case thickness by an amount corresponding to the recess. As a result, it becomes possible to reduce the case thickness.

Further, since the shield member can be established its position by a mere engagement thereof with the shaft portion of the slide knob, the working efficiency is improved and there no longer is any fear that the shield member may fall off during assembly.

Further, since the shield member is formed with a thin plate-like substrate portion inside the annular projections, the substrate portion having an insertion hole, and is also formed with a thin plate-like outer edge portion in a surrounding relation to the outside of the annular projections, even if the annular projections undergo a force in a direction of being wound to the outer surface side of the lower case due to rubbing thereof against the outer surface of the lower case during a sliding motion of the annular projections, the outer edge portion of the shield member prevents the annular projections from being wound and thus it is possible to mitigate the phenomenon of inhibiting the movement in the sliding direction and also possible to effect a smooth sliding motion.

Further, since the annular projections are formed respectively on both upper and lower surfaces of the shield member so that the shield member is spaced from the lower surface of the slide knob and also from the outer surface of the case through the annular projections, even when the slide knob slides within the slide hole, the shield member is not rubbed throughout the whole surface thereof against the lower surface of the slide knob and the outer surface of the lower case, the operating touch of the slide knob is not deteriorated by a rough surface of the lower case for example.

Further, since the contact member is provided with spring pieces for elastic contact with the inner surface of the case and the shield member is held grippingly between the lower surface of the slide knob and the outer surface of the lower case with the biasing force of the spring pieces, the lower surface of the slide knob and the outer surface of the lower case are brought into close contact with each other to a satisfactory extent through the shield member, thus making it possible to prevent the entry of water or water drops into the interior of the lower case from the exterior.

What is claimed is:

1. A slide switch comprising:

a case having a slide hole;

a slide knob attached slidably to an outer surface of the case, the slide knob having a shaft portion inserted into the slide hole of the case;

a shield member disposed between a lower surface of the slide knob and an outer surface of the case, the shield member having an insertion hole for insertion therein of the shaft portion of the slide knob; and a contact member disposed in the interior of the case and retained by the shaft portion of the slide knob, wherein the shield member is engaged with the shaft portion of the slide knob so as to be slidable with the slide knob and is formed with an annular projection outside an outer periphery of the insertion hole, also formed with a thin plate-like substrate portion inside the annular projection, the substrate portion having the insertion hole, and is further formed with a thin plate-like outer edge portion which surrounds the outside of the annular projection.

2. A slide switch according to claim 1, wherein the annular projection is formed on each of upper and lower surfaces of the shield member so that the shield member is spaced from the lower surface of the slide knob and also from the outer surface of the case.

3. A slide switch according to claim 2, wherein the contact member is provided with a spring piece for elastic contact with an inner surface of the case, and the shield member is held grippingly between the lower surface of the slide knob and the outer surface of the case with the biasing force of the spring piece.

* * * * *